(12) United States Patent
Liu et al.

(10) Patent No.: US 9,798,925 B2
(45) Date of Patent: Oct. 24, 2017

(54) METHOD FOR IDENTIFYING PDF DOCUMENT

(71) Applicant: Fujian Foxit Software Development Joint Stock Co., Ltd., Fuzhou (CN)

(72) Inventors: Fangming Liu, Beijing (CN); Xiaolong Fan, Beijing (CN)

(73) Assignee: Fujian Foxit Software Development Joint Stock Co., Ltd., Fuzhou (CN)

(*) Notice: Subject to any disclaimer, the term of this patent is extended or adjusted under 35 U.S.C. 154(b) by 77 days.

(21) Appl. No.: 14/778,155

(22) PCT Filed: Mar. 14, 2014

(86) PCT No.: PCT/CN2014/000271
§ 371 (c)(1),
(2) Date: Sep. 18, 2015

(87) PCT Pub. No.: WO2014/146483
PCT Pub. Date: Sep. 25, 2014

(65) Prior Publication Data
US 2016/0247020 A1    Aug. 25, 2016

(30) Foreign Application Priority Data
Mar. 19, 2013   (CN) .......................... 2013 1 0088513

(51) Int. Cl.
*G06K 9/48* (2006.01)
*G06K 9/00* (2006.01)
(Continued)

(52) U.S. Cl.
CPC ..... *G06K 9/00469* (2013.01); *G06F 17/2247* (2013.01); *G06F 17/241* (2013.01);
(Continued)

(58) Field of Classification Search
CPC .... G06F 17/241; G06F 17/2247; G06F 17/27; G06F 17/2745; G06K 9/00463; G06K 9/00449; G06K 9/00469
(Continued)

(56) References Cited

U.S. PATENT DOCUMENTS

2003/0004957 A1    1/2003 Broman et al.
2007/0250497 A1*  10/2007 Mansfield ......... G06F 17/30731

FOREIGN PATENT DOCUMENTS

CN    101866335    10/2010
CN    101876967    11/2010
(Continued)

OTHER PUBLICATIONS

Computer English Translation of Chinese Patent No. 101866335 (A), pp. 1-10.*
(Continued)

*Primary Examiner* — Daniel Mariam
(74) *Attorney, Agent, or Firm* — Rankin, Hill & Clark LLP

(57) ABSTRACT

The present invention discloses a method for identifying PDF document. wherein, it comprises the following steps: S1: analyzing the path objects in the PDF document, and identifying the forms in PDF document; S2: analyzing the text objects outside the form regions in the PDF document, and recognizing the text contents in the PDF document; S3: writing the identified results into a temporary file, or writing them into the PDF document as an attachment. The method for identifying PDF document provided by the present invention could identify the tables, the paragraphs, titles, the tabulations and so on in the PDF document, thereby, the PDF document can be edited with the paragraph as a unit, and be tagged conveniently to confirm the reading order, so as to facilitate the reading of people with visual impairment; in
(Continued)

the same time, it also can derive document in other forms according to the identified results, which thereby greatly facilitates users to read and edit the PDF document.

3 Claims, 3 Drawing Sheets

(51) Int. Cl.
    *G06F 17/27*     (2006.01)
    *G06F 17/24*     (2006.01)
    *G06F 17/22*     (2006.01)

(52) U.S. Cl.
    CPC .......... *G06F 17/27* (2013.01); *G06F 17/2745* (2013.01); *G06K 9/00449* (2013.01)

(58) Field of Classification Search
    USPC ................................ 382/176–177, 182, 200
    See application file for complete search history.

(56) References Cited

FOREIGN PATENT DOCUMENTS

| | | |
|---|---|---|
| CN | 101976232 | 2/2011 |
| CN | 102317933 | 1/2012 |

OTHER PUBLICATIONS

International Search Report of PCT/CN2014/000271 dated Jun. 16, 2014, 4 pages (English and Chinese translations).

\* cited by examiner xxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxx.

Fig. 1(a)

| XX | XX | XX | XX | XX | XX |
|----|----|----|----|----|----|
| X  | X  | X  | X  | X  | X  |
| X  | X  | X  | X  | X  | X  |
| X  | X  | X  | X  | X  | X  |
| X  | X  | X  | X  | X  | X  |

Fig. 1(b)

- ➢ xxxxxxxxxxxxxxxxxxxxxxxxxx
- ➢ xxxxxxxxxxxxxxxxxxxxxxxxxxxxxxxxx
- ➢ xxxxxxxxxxxxxxxxxxxxxxxxxxxxxxxxxxxx
- ➢ xxxxxxxxxxxxxxxxxxxxxxxxxxxxxxxxxxxxx

Fig. 1(c)

METHOD FOR IDENTIFYING PDF DOCUMENT

TECHNICAL FIELD

The present invention relates to a technical field of editing PDF documents, in particular, which is related to a method for identifying the tables, paragraphs, titles, and tabulations in PDF documents.

BACKGROUND

PDF file has its own bookmark function. The bookmark can be added at the page being read by the readers, so that the readers can skip to the page by clicking on the bookmark in the next reading, instead of searching from the start page, which provides readers convenience to a certain extent. However, in the prior art, the readers can only mark the reading pages by bookmarks, but cannot mark different location in the same page. Thus readers can only read and search from the first line of the marked page after skip to the marked page. It is really a time-consuming and effortless matter for the people with visual impairment. Therefore, it is really a problem to be solved urgently for those skilled in the art to provide a method that not only can recognize different page, but also can identify different content on the same page, so as to directly position at the specific location in a page when adding a bookmark.

SUMMARY OF THE INVENTION

The purpose of the present invention is to overcome the above-mentioned shortcoming in the prior art, and provide a kind of identifying method to identify different constituent parts in PDF document.

In order to achieve the purpose above, the present invention provides a kind of method for identifying PDF documents, which comprises the following steps:

S1: Analyzing the path objects in the PDF document, and identifying the table in the PDF document;

S2: analyzing the text objects outside the form regions in the PDF document, and recognizing the text content in the PDF document;

S3: Writing the identified results into a temporary file, or writing them into the PDF document as an attachment.

A kind of identifying method for PDF document provided by the present invention, wherein said step S1 comprising:

S11: Extracting the line path objects in horizontal direction and vertical direction, recognizing one or multiple tables constituted by said line path objects according to the intersecting situations of said line path objects;

S12: Finding out the maximum value and the minimum value of the extracted line endpoints in the horizontal direction coordinate and vertical direction coordinate, and defining the rectangular region of the table by those four values.

S13: Analyzing the other objects in the rectangular region positioned in the table.

A kind of identifying method for PDF documents provided by the present invention, wherein said step S2 comprising:

S21: Finding the minimum value $x_{Lmin}$ of the text objects and the page left margin distances in the document;

S22: Finding out the rows of which the distance of the start characters and the page left margin is $x_{Lmin}$+ fragment shrink, and be defined as the start rows; let the content from start row of each fragment to the start row of a next fragment is analyzed as one fragment.

A kind of method for identifying PDF documents provided by the present invention, wherein, if there is one row in a fragment only, and all the attributes of all the characters in said row are different from the attributes of the characters in other fragment, and then said row is analyzed as a title of one fragment.

A kind of identifying method for PDF documents provided by the present invention, wherein, further comprising the following steps S31: Extracting the initial character of the first text object of each fragment according to the identified result of the fragments;

S32: comparing the extracted initial characters, regarding all the fragments in which the initial characters coincided with list up characteristics exist as one list up; wherein, the characteristic of the list up comprising: the initial characters of the several continuous fragments are the same non-text type symbols, or the numberings of sequential arrangement.

Compared with the existing technologies, the beneficial effects of the present invention is in that:

The present invention provides a kind of method for identifying PDF documents, which could identify the tables, the paragraphs, headlines and the lists in the PDF documents and so on, thereby, the PDF documents can be edited basing on paragraphs as the unit, and be tagged conveniently to determine the reading order, and be read easily for the persons with lower vision; at the same time, they can also be exported in other formats by the identified results, which thereby greatly facilitates users to read and edit the PDF documents.

DESCRIPTION OF THE DRAWINGS

FIG. 1 (a), FIG. 1 (b) and FIG. 1 (c) are the schematic diagram of paragraphs, forms and lists separately referred in the present invention;

DETAILED DESCRIPTION OF THE EMBODIMENTS

The description of the technical proposal of implementations of the present invention is given clearly and integrality as following. The given implementations are only part of the implementations to the present invention obviously, but not entire implementations. Based on the implementations of the present invention, all of the other implementations which get without devoting a creative work by the ordinary technicians in this field should be deemed to be within the scope of the present invention.

Figure 2:
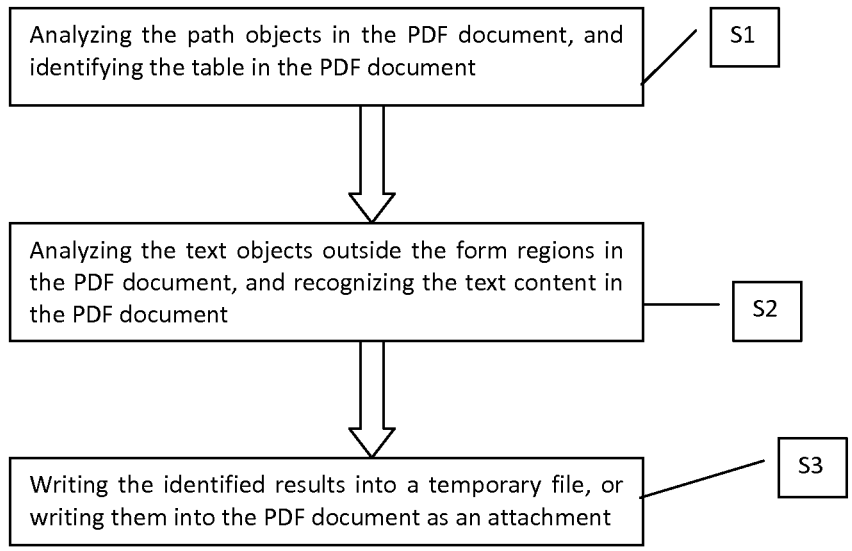
FIG. 2 is a flow diagram of the method for identifying PDF documents in the present invention.

A method for identifying PDF documents proposed by the present invention, which mainly be used for identifying the tables, the paragraphs, headlines and the lists in the PDF documents. Its basis is that the different contents in the document have different characteristics; for example, there are two characters indent at the head of each paragraph; the line pitches, the font sizes and fonts among the paragraph titles and contexts are all different; normally, the table contains the element headers, column titles, row titles, tail of the form, cells, borders, and it must contain multiple cells with the same row height or column height; the list generally contains prefixed special symbols or serial numbers, that is, there are extra items except the text content. And the specific manifestation patterns can refer to FIG. 1 (a), FIG. 1 (b) and FIG. 1 (c). According to the above features, the present invention propose the method for identifying PDF documents by means of technologies, As shown in FIG. 2, it comprises the following steps:

S1: Analyzing the path objects in the PDF document, and identifying the table in the PDF document;

S2: analyzing the text objects outside the form regions in the PDF document, and recognizing the text content in the PDF document;

S3: Writing the identified results into a temporary file, or writing them into the PDF document as an attachment.

Form identification is the basis of identifying PDF documents, after confirming the form regions by identifying tables, the characters of the rest of the PDF document are recognized, and the identifying results are saved. It can be saved in the form of writing in temporary files, for what is saved in the temporary files is the identified results, therefore, other applications which need to use the identified results may retrieve the temporary files directly, instead of always identifying them every time, so that it can save some time. In addition, it also can take advantage of the features of the function for supporting attachments in the PDF document itself to add the identified results to the PDF document according to the steps of adding attachment.

Figure 3:
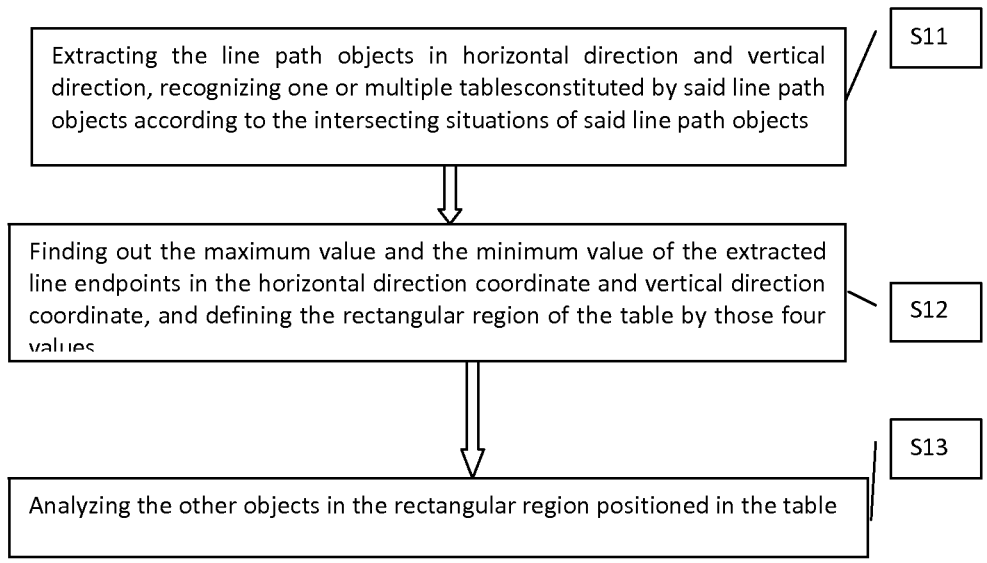
FIG. 3 is a flow diagram of the steps of the form recognition in the present invention.

As shown in FIG. 3, wherein, the step of identifying the forms in the step S1 above-mentioned also comprises the following steps:

S11: Extracting the line path objects in horizontal direction and vertical direction, recognizing one or multiple tables constituted by said line path objects according to the intersecting situations of said line path objects;

S12: Finding out the maximum value and the minimum value of the extracted line endpoints in the horizontal direction coordinate and vertical direction coordinate, and defining the rectangular region of the table by those four values.

S13: analyzing the other objects in the rectangular region positioned in the table.

The other objects here refer to all of characters and symbols within the table regions, if there is no other object, and then the current table is an empty table.

Figure 4:
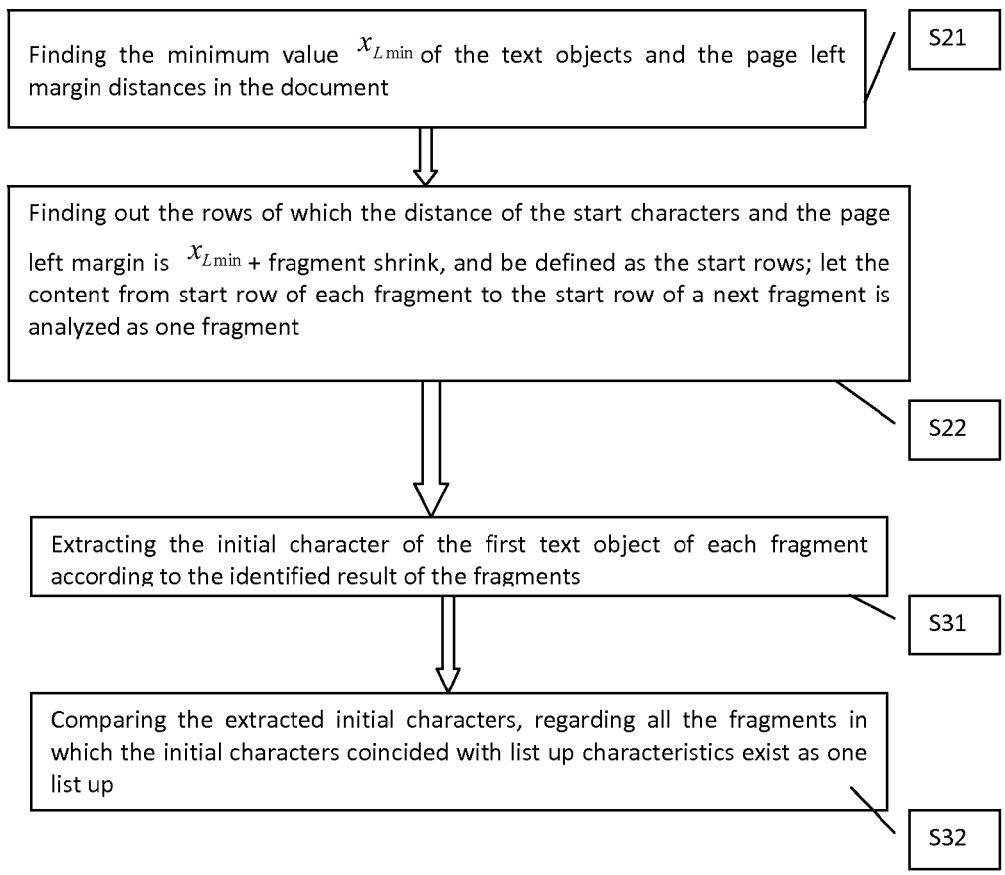
FIG. 4 is a flow diagram of the identifying steps of the paragraphs and lists in the present invention.

As shown in FIG. 4, the step of identifying the text content in the above-mentioned step S2 also comprises the following steps:

S21: Finding the minimum value $x_{Lmin}$ of the text objects and the page left margin distances in the document;

S22: Finding out the rows of which the distance of the start characters and the page left margin is $x_{Lmin}$+ fragment shrink, and be defined as the start rows; let the content from start row of each fragment to the start row of a next fragment is analyzed as one fragment.

If there is one row in a fragment only, and all the attributes of all the characters in said row are different from the attributes of the characters in other fragment, and then said row is analyzed as a title of one fragment.

When the initial characters of the multiple continuous paragraphs all contain the symbols except for the text, then the continuous paragraphs constitute one list. Therefore, the present invention proposes the step of identifying lists on the basis of identifying the paragraphs, which comprising:

S31: Extracting the initial character of the first text object of each fragment according to the identified result of the fragments;

S32: comparing the extracted initial characters, regarding all the fragments in which the initial characters coincided with list up characteristics exist as one list up; wherein, the characteristic of the list up comprising: the initial characters of the several continuous fragments are the same non-text type symbols, or the numberings of sequential arrangement.

In summary, a kind of method for identifying PDF documents proposed by the present invention lets users read and operate the format documents with the habits of reading streaming document; In the meantime, the different zones of the PDF document can be marked or tagged to determine the reading order, and be read easily for the reader.

For the present invention described above are merely illustrative, is not intended to limit the invention, the ordinary technicians in this field can understand it as the following, the present invention of any modification, improvement, equivalent replacement, etc. where is within the spirit and principle, should be deemed to be within the scope of the present invention.

What is claimed is:

1. A computer-implemented method for identifying PDF document, wherein, comprising the following steps:

S1: analyzing the path objects in the PDF document, and identifying the table in the PDF document;

S2: analyzing the text objects outside the identified table in the PDF document, and recognizing the text content in the PDF document; and S3: writing the identified results into a temporary file, or writing them into the PDF document as an attachment, wherein said step S1 comprising:

S11: extracting the line path objects in horizontal direction and vertical direction, recognizing one or multiple tables constituted by said line path objects according to the intersecting situations of said line path objects, wherein the process of extracting and recognizing include:

taking each line segment of each line path object as a quadrilateral with 4vertexes, obtaining coordinates x1, y1, x2, y2of any two vertices in the same diagonal, and generating a rectangle by using the coordinates x1, y1, x2, y2as two vertices coordinates in the same diagonal of the rectangle;

comparing an area difference between the quadrilateral and the rectangle, and if the area difference is greater than a threshold, then discarding the line segment;

selecting rectangles satisfying a height-width ratio, and discarding the other rectangles;

taking areas which are surrounded by line segments intersectant with each other as a potential form unit, storing the potential form unit in a data structure;

overshadowing all the rectangles in each potential form unit to an axis which is parallel to a shorter line segment, combining reduplicated projection segments, and storing the reduplicated projection segments in the data structure; and taking a line which is vertical to the projection segment and beginning from a midpoint of the projection segment as split lines of rows and columns, storing all the split lines in the data structure;

S12: finding out the maximum value and the minimum value of the extracted line endpoints in the horizontal direction coordinate and vertical direction coordinate, and defining the rectangular region of the table by those four values; and S13: analyzing the other objects in the rectangular region positioned in the table, wherein said step S2 comprising:

S21: finding the minimum value $x_{Lmin}$ of the text objects and the page left margin distances in the document; and S22: finding out the rows of which the distance of the start characters and the page left margin is $x_{Lmin}$+ fragment shrink, and be defined as the start rows; let the content from start row of each fragment to the start row of a next fragment is analyzed as one fragment.

2. The computer-implemented method for identifying PDF document of claim 1, wherein, if there is one row in a fragment only, and all the attributes of all the characters in said row are different from the attributes of the characters in other fragment, and then said row is analyzed as a title of one fragment.

3. The computer-implemented method for identifying PDF document of claim 1, wherein, further comprising the following steps:

S31: extracting the initial character of the first text object of each fragment according to the identified result of the fragments; and S32: comparing the extracted initial characters, regarding all the fragments in which the initial characters coincided with list up characteristics exist as one list up;

wherein, the characteristic of the list up comprising: the initial characters of the several continuous fragments are the same non-text type symbols, or the numberings of sequential arrangement.

* * * * *